(12) United States Patent
Miyazaki et al.

(10) Patent No.: US 9,079,535 B2
(45) Date of Patent: Jul. 14, 2015

(54) TONNEAU COVER DEVICE

(75) Inventors: Shinichi Miyazaki, Aichi (JP);
Hiroyuki Mori, Nagoya (JP); Kunihiko Sugiyama, Nagoya (JP)

(73) Assignees: KABUSHIKI KAISHA TOKAI RIKA DENKI SEISAKUSHO, Aichi (JP); HAYASHI TELEMPU CO., LTD, Aichi-Ken (JP)

( * ) Notice: Subject to any disclaimer, the term of this patent is extended or adjusted under 35 U.S.C. 154(b) by 0 days.

(21) Appl. No.: 14/006,779

(22) PCT Filed: Mar. 23, 2012

(86) PCT No.: PCT/JP2012/002024
§ 371 (c)(1),
(2), (4) Date: Sep. 23, 2013

(87) PCT Pub. No.: WO2012/132364
PCT Pub. Date: Oct. 4, 2012

(65) Prior Publication Data
US 2014/0015275 A1 Jan. 16, 2014

(30) Foreign Application Priority Data

Mar. 30, 2011 (JP) ................................. 2011-075516

(51) Int. Cl.
*B60R 7/04* (2006.01)
*B60R 5/04* (2006.01)

(52) U.S. Cl.
CPC ................. *B60R 5/044* (2013.01); *B60R 5/047* (2013.01)

(58) Field of Classification Search
CPC .......... B60J 7/102; B60J 7/1621; B60J 7/104; B60J 7/141; B60J 7/04; B60J 7/1265; B60J 7/202

USPC .............. 296/37.16, 100.01, 100.02, 100.06, 296/100.07, 100.08, 100.09, 100.1, 100.18, 296/136.03
See application file for complete search history.

(56) References Cited

U.S. PATENT DOCUMENTS

| 4,728,141 | A | | 3/1988 | Motozawa et al. |
| 5,772,274 | A | * | 6/1998 | Tokarz ..................... 296/107.09 |
| 6,114,819 | A | * | 9/2000 | Porter et al. .................. 318/466 |
| 6,246,199 | B1 | * | 6/2001 | Porter et al. .................. 318/466 |

(Continued)

FOREIGN PATENT DOCUMENTS

| CN | 101343963 | 1/2009 |
| CN | 101439693 | 5/2009 |

(Continued)

OTHER PUBLICATIONS

U.S. Appl. No. 14/003,101 to Takashi Nagao et al., filed Sep. 4, 2013.

(Continued)

*Primary Examiner* — Kiran B. Patel
(74) *Attorney, Agent, or Firm* — Greenblum & Bernstein, P.L.C.

(57) ABSTRACT

A tonneau cover device electrically moves a tonneau cover between an extension position, at which the tonneau cover conceals a cargo compartment of a vehicle, and a storage position, at which the tonneau cover is separated from the cargo compartment. The tonneau cover device includes a switch, which is operated from outside the vehicle, and a tonneau cover control unit, which moves the tonneau cover between the extension position and the storage position when the switch is operated.

5 Claims, 3 Drawing Sheets

(56) References Cited

U.S. PATENT DOCUMENTS

| | | | |
|---|---|---|---|
| 6,283,532 B1* | 9/2001 | Neubrand | 296/107.07 |
| 6,288,511 B2* | 9/2001 | Porter et al. | 318/466 |
| 6,299,233 B1* | 10/2001 | Mentink | 296/107.09 |
| 6,309,005 B1* | 10/2001 | Priest et al. | 296/100.06 |
| 6,416,103 B1 | 7/2002 | Laudenbach et al. | |
| 6,508,502 B2* | 1/2003 | Willard | 296/107.07 |
| 6,623,062 B1* | 9/2003 | Hoffman | 296/100.1 |
| 6,692,061 B1* | 2/2004 | Willard | 296/116 |
| RE38,546 E* | 7/2004 | Corder et al. | 296/108 |
| 6,830,281 B2* | 12/2004 | Hoffman | 296/100.1 |
| 6,951,363 B2* | 10/2005 | Hoffman | 296/100.1 |
| 7,537,265 B2* | 5/2009 | Hori et al. | 296/100.15 |
| 7,641,256 B2* | 1/2010 | Kodaira et al. | 296/37.16 |
| 7,673,921 B2* | 3/2010 | Hirayama et al. | 296/37.16 |
| 8,087,713 B2* | 1/2012 | Schrader et al. | 296/100.18 |
| 8,414,049 B2* | 4/2013 | Parker | 296/24.4 |
| 8,465,079 B2* | 6/2013 | Saito et al. | 296/100.16 |
| 8,491,029 B2* | 7/2013 | Kusu | 296/24.43 |
| 8,523,268 B2* | 9/2013 | Kikuchi et al. | 296/136.04 |
| 2001/0004156 A1* | 6/2001 | Neubrand et al. | 296/76 |
| 2004/0000797 A1 | 1/2004 | Laudenbach et al. | |
| 2005/0093330 A1* | 5/2005 | Hoffman | 296/100.1 |
| 2005/0285410 A1* | 12/2005 | Doncov et al. | 292/201 |
| 2007/0096500 A1* | 5/2007 | Corder et al. | 296/121 |
| 2008/0129076 A1* | 6/2008 | Araki et al. | 296/107.08 |
| 2009/0018734 A1 | 1/2009 | Hayama et al. | |
| 2009/0058128 A1* | 3/2009 | Hirayama et al. | 296/136.03 |
| 2009/0102229 A1* | 4/2009 | Wiechowski et al. | 296/121 |
| 2009/0167043 A1* | 7/2009 | Aebker | 296/37.16 |
| 2011/0101736 A1* | 5/2011 | Sogame | 296/203.04 |
| 2011/0181056 A1* | 7/2011 | Brose et al. | 292/336.3 |
| 2011/0254312 A1* | 10/2011 | Yano | 296/146.13 |
| 2011/0291799 A1* | 12/2011 | Girard et al. | 340/5.72 |
| 2011/0309922 A1* | 12/2011 | Ghabra et al. | 340/426.36 |
| 2012/0234621 A1* | 9/2012 | Syvret et al. | 180/281 |
| 2013/0116860 A1* | 5/2013 | Kawai et al. | 701/2 |
| 2013/0219974 A1* | 8/2013 | Lange | 70/91 |
| 2013/0239485 A1* | 9/2013 | Reed et al. | 49/386 |
| 2013/0341950 A1* | 12/2013 | Nagao et al. | 296/37.16 |
| 2014/0008933 A1* | 1/2014 | Nagao et al. | 296/37.16 |
| 2014/0015275 A1* | 1/2014 | Miyazaki et al. | 296/136.03 |
| 2014/0015276 A1* | 1/2014 | Nagao et al. | 296/136.03 |
| 2014/0015596 A1* | 1/2014 | Martin et al. | 327/517 |
| 2014/0103865 A1* | 4/2014 | Van Wiemeersch et al. | 320/108 |
| 2014/0168437 A1* | 6/2014 | Rother et al. | 348/148 |
| 2014/0210677 A1* | 7/2014 | Fahlbusch et al. | 343/713 |

FOREIGN PATENT DOCUMENTS

| | | |
|---|---|---|
| DE | 102005055625 | 5/2007 |
| DE | 102006057668 | 6/2008 |
| JP | 2003-110554 | 4/2003 |
| JP | 2006-088942 | 4/2006 |
| JP | 2007-016482 | 1/2007 |
| JP | 2007-196940 | 8/2007 |
| JP | 2008-037190 | 2/2008 |
| JP | 2010-012983 | 1/2010 |
| JP | 2010-137751 | 6/2010 |

OTHER PUBLICATIONS

U.S. Appl. No. 14/004,026 to Takashi Nagao et al., filed Sep. 9, 2013.
U.S. Application No. 14/006,800 to Takashi Nagao et al., filed Sep. 23, 2013.
International Search Report dated Jul. 2, 2012.
Japan Office action, mail date is Aug. 12, 2014.
Japan Office action, mail date is Jan. 13, 2015.
China Office action, mail date is Feb. 25, 2015 along with an English language translation thereof.

* cited by examiner

TONNEAU COVER DEVICE

FIELD

The present invention relates to a tonneau cover device that conceals a cargo compartment.

BACKGROUND

Tonneau cover devices are installed in vehicles to conceal cargo compartments. A tonneau cover device includes a hard or soft tonneau cover that moves in a horizontal direction of the vehicle above a cargo compartment. Japanese Laid-Open Patent Publication No. 2007-196940 describes a tonneau cover device that includes a tonneau cover. A switch, which is arranged in the vehicle, is operated to electrically move the tonneau cover.

CITATION LIST

Patent Literature

[PTL 1]
Japanese Laid-Open Patent Publication No. 2007-196940

SUMMARY

When opening a hatchback door of a vehicle, it is preferred that the tonneau cover be separated from the cargo compartment and located at a storage position so that objects can be easily placed in or removed from the cargo compartment. When closing the hatchback door, it is preferred that the tonneau cover be located at an extension position to cover and conceal the cargo compartment from above. However, in the tonneau cover device of the above publication, a switch, which is located in the vehicle, is operated to move the tonneau cover between the storage position and the extension position. Accordingly, when a user leaves the vehicle and becomes aware that the tonneau cover is located at the storage position, the user must return to the vehicle and operate the switch in the vehicle to move the tonneau cover to the extension position. Further, when the user places an object in or removes an object from the cargo compartment and then leaves the vehicle, the user must enter the vehicle again and operate the switch to move the tonneau cover to the extension position. This is inconvenient for the user.

Accordingly, it is an object of the present invention to provide a convenient tonneau cover device.

One aspect of the present invention is a tonneau cover device that electrically moves a tonneau cover between an extension position, at which the tonneau cover conceals a cargo compartment of a vehicle, and a storage position, at which the tonneau cover is separated from the cargo compartment. The tonneau cover device includes a switch operated from outside the vehicle. A tonneau cover control unit moves the tonneau cover between the extension position and the storage position when the switch is operated.

In this structure, even when the user is outside the vehicle, the user may operate the switch to move the tonneau cover between the extension position and the storage position. For example, when the user leaves the vehicle and becomes aware that the tonneau cover is located at the storage position, the user may operate the switch outside the vehicle to move the tonneau cover to the extension position. Further, when the user leaves the vehicle after placing an object in or removing an object from the cargo compartment with the tonneau cover located at the storage position, the user may operate the switch outside the vehicle to move the tonneau cover to the extension position.

In the tonneau cover device, the switch may be located at an outer side of the vehicle door. The vehicle may include a verification control unit that transmits a request signal to an electronic key carried by a user through wireless communication and determines whether a response signal transmitted from the electronic key through the wireless communication in response to the request signal is valid. In this case, when the verification control unit determines that the response signal is valid, the tonneau cover control unit shifts to a state in which control of the tonneau cover is permitted and moves the tonneau cover between the extension position and the storage position when the switch is operated.

In this structure, the user carrying the electronic key may operate the switch arranged at the outer side of the vehicle door to move the tonneau cover between the extension position and the storage position.

In the tonneau cover device, the vehicle may include a door control unit that controls locking and unlocking of a vehicle door. The door control unit may switch the vehicle door between a lock state and an unlock state when the switch is operated in accordance with a first pattern in a state in which the verification control unit has determined that the response signal is valid. The tonneau cover control unit may move the tonneau cover between the extension position and the storage position when the switch is operated in accordance with a second pattern in the state in which the verification control unit has determined that the response signal is valid.

In this structure, a single switch may be used to lock and unlock the vehicle door and move the tonneau cover. Thus, there is no need for a switch dedicated to the operation of the tonneau cover, and the tonneau cover device may have a further simple structure.

In the tonneau cover device, the switch may be arranged in an electronic key carried by a user. The electronic key may transmit a tonneau cover control request signal that requests movement of the tonneau cover between the extension position and the storage position when the switch is operated. The tonneau cover control unit may move the tonneau cover between the extension position and the storage position in accordance with the tonneau cover control request signal.

In this structure, by operating the switch of the electronic key, the tonneau cover may be moved to the extension position or the storage position from a location distant from the vehicle based on the tonneau cover control request signal.

In the tonneau cover device, the vehicle may include a door control unit that locks and unlocks a vehicle door. The electronic key may transmit a lock-unlock request signal that requests switching the vehicle door between a lock state and an unlock state when the switch is operated in accordance with a first pattern. The electronic key may transmit the tonneau cover control request signal when the switch is operated in accordance with a second pattern.

In this structure, by operating the switch of the electronic key in accordance with the second pattern, the tonneau cover may be moved to the extension position or the storage position from a location distant from the vehicle. This structure may reduce the number of switches arranged in the electronic key.

In the tonneau cover device, the first pattern may be a short pushing operation in which the switch is operated for a period that is less than a certain time. The second pattern may be a long pushing operation in which the switch is operated for a period that is greater than or equal to the certain time.

In this structure, the vehicle door may be switched between a lock state and an unlock state by short-pushing the switch. The tonneau cover may be moved by long-pushing the switch. Accordingly, a single switch may be used to perform locking and unlocking, which is often carried out, and move the tonneau cover, if necessary, when long pushed.

In the tonneau cover device, the switch may be arranged at an outer side of a hatchback door located at the rear of the vehicle.

In this structure, the arrangement of the switch at the hatchback door may prevent unintentional operation of the tonneau cover device that may occur if the switch were to be arranged on other doors.

In this structure, the switch may be arranged at an outer side of each of a plurality of vehicle doors including a hatchback door located at the rear of the vehicle.

The tonneau cover device may further include a switch control unit that detects when the switch is operated by a user. In this case, the switch control unit may determine whether the switch has been operated to unlock or lock a vehicle door or to move the tonneau cover.

In the tonneau cover device, the tonneau cover control unit may be arranged in an in-vehicle controller installed in the vehicle.

Other aspects and advantages of the present invention will become apparent from the following description, taken in conjunction with the accompanying drawings, illustrating by way of example the principles of the invention.

The invention, together with objects and advantages thereof, may best be understood by reference to the following description of the presently preferred embodiments together with the accompanying drawings.

DESCRIPTION OF EMBODIMENTS

<First Embodiment>

A tonneau cover device 50 according to a first embodiment will now be described with reference to FIG. 1. In the first embodiment, the tonneau cover device 50 is used with, for example, an electronic key system 1.

Figure 1:
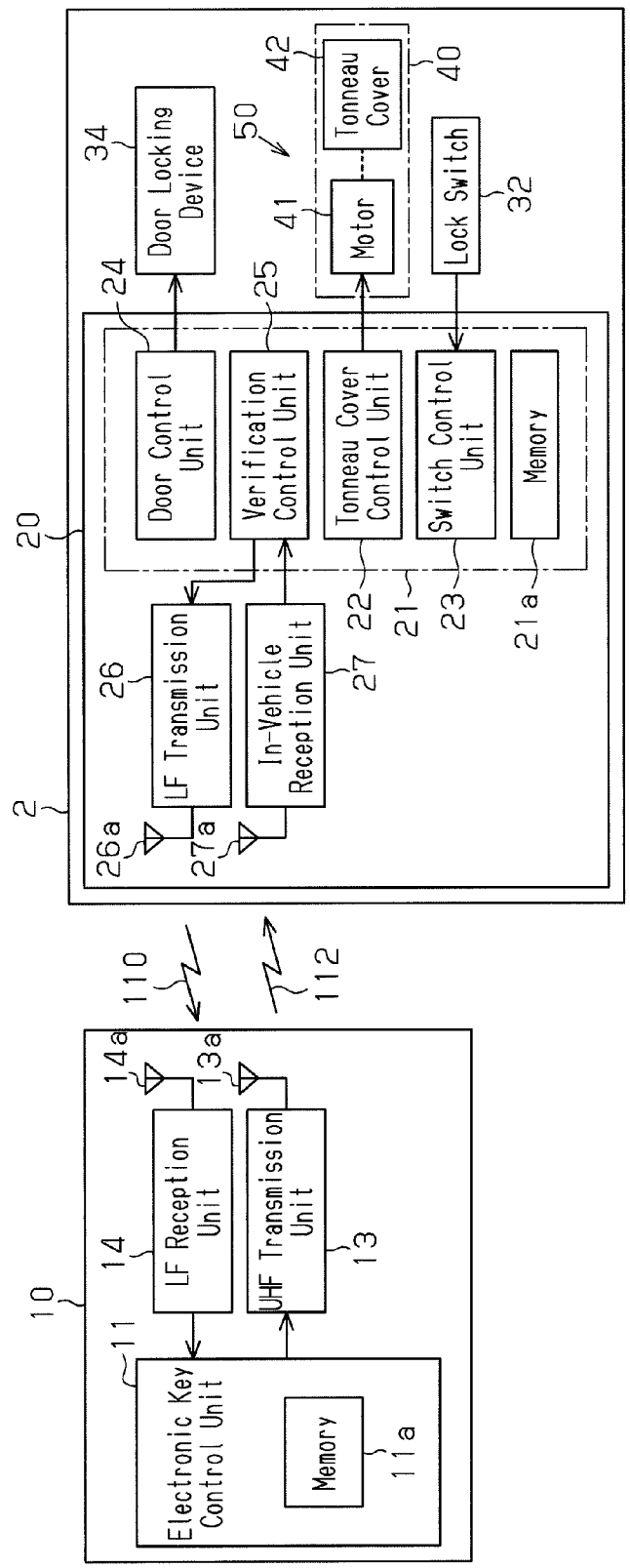
FIG. 1 is a block diagram of an electronic key system in a first embodiment.

As shown in FIG. 1, the electronic key system 1 includes an electronic key 10, which is held by a user of a vehicle 2, and an in-vehicle device 20, which is installed in the vehicle 2. In the electronic key system 1, communication is automatically performed between the electronic key 10 and the in-vehicle device 20. When communication is established between the electronic key 10 and the in-vehicle device 20, for example, the locking and unlocking of a vehicle door is permitted. The electronic key system 1 will now be described in detail.

Electronic Key

As shown in FIG. 1, the electronic key 10 includes an electronic key control unit 11, an ultrahigh frequency (UHF) transmission unit 13, and a low frequency (LF) reception unit 14.

The electronic key control unit 11 is formed by a computer unit and includes a non-volatile memory 11a. The memory 11a stores an ID code, which is unique to the electronic key 10.

The LF reception unit 14 receives a request signal 110, which is transmitted from the in-vehicle device 20 on the LF band, with a reception antenna 14a. The LF reception unit 14 demodulates the request signal 110 to a pulse signal and sends the pulse signal to an electronic key control unit 11. When receiving the pulse signal (request signal 110), the electronic key control unit 11 sends a response signal 112, which includes the ID code stored in the memory 11a, to the UHF transmission unit 13. The UHF transmission unit 13 demodulates the response signal 112 and transmits the demodulated signal (response signal 112) from a transmission antenna 13a as a wireless signal on the UHF band.

In-Vehicle Device The in-vehicle device 20 includes an in-vehicle controller 21, which is formed by a computer unit. The in-vehicle controller 21 includes a tonneau cover control unit 22, a switch control unit 23, a door control unit 24, and a verification control unit 25. The control units 22 to 25 are connected to one another by a connection line (not shown).

The verification control unit 25 includes an LF transmission unit 26, which transmits a wireless signal on the LF band, and an in-vehicle reception unit 27, which receives a wireless signal on the UHF band. The door control unit 24 is electrically connected to a door locking device 34, which performs the locking and unlocking of vehicle doors.

Figure 2:
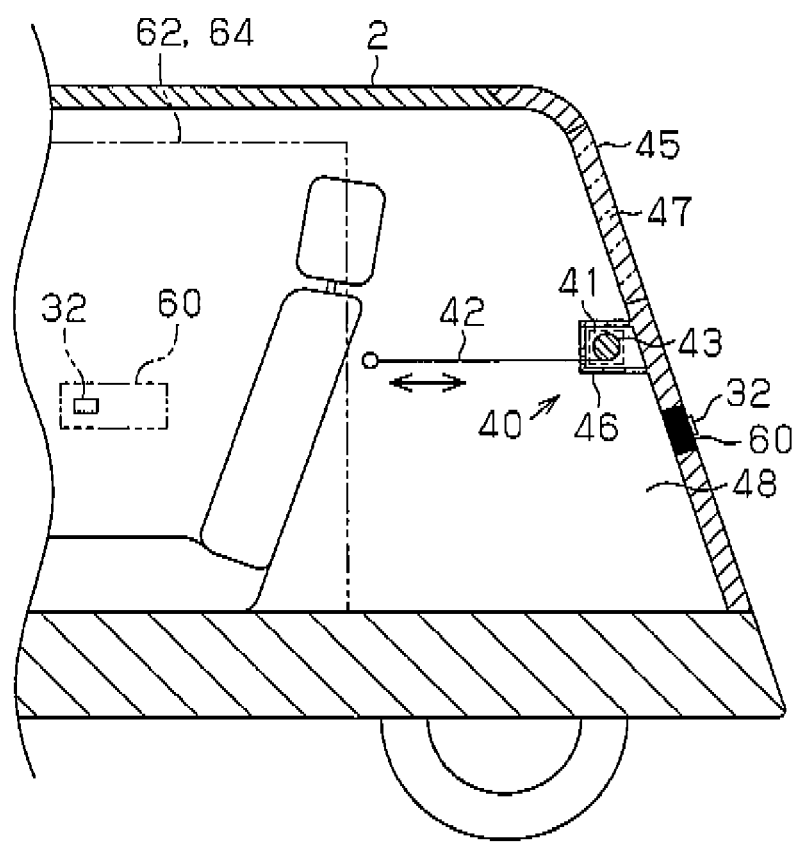
FIG. 2 is a side view showing a tonneau cover device in the first embodiment.

The switch control unit 23 is electrically connected to a lock switch 32. The lock switch 32 is arranged on the outer side of each vehicle door, for example, on the door handle 60 as illustrated in FIG. 2. There may be, for example, a total of five vehicle doors, namely, a left front door, a right front door, a left rear door 62, a right rear door 64, and a hatchback door 45. The lock switch 32 sends an operation signal, when pushed, to the switch control unit 23.

The tonneau cover control unit 22 is electrically connected to a tonneau cover unit 40. In the first embodiment, the tonneau cover device 50 includes the tonneau cover control unit 22, the switch control unit 23, the lock switch 32, and the tonneau cover unit 40. As shown in FIG. 2, the tonneau cover unit 40 is arranged in the vehicle 2 near the hatchback door 45. The tonneau cover unit 40 includes a motor 41, a tonneau cover 42, a roller 43, and a case 46. The roller 43 is rod-shaped and supported in the case 46, which is coupled to the hatchback door 45, to be rotatable about an axis extending in a lateral direction of the vehicle 2 (direction perpendicular to the plane of FIG. 2). The tonneau cover 42 is formed by a sheet having a basal end fixed to the circumferential surface of the roller 43. The motor 41 is driven to rotate the roller 43 in a forward direction or reverse direction with a link mechanism (not shown). This rolls the tonneau cover 42 onto or out from the roller 43. The tonneau cover 42 moves in the front to rear direction of the vehicle 2 (sideward direction in FIG. 2) along a guide (not shown). A spring (not shown), which is incorporated in the roller 43, constantly applies tension to the tonneau cover 42 when rolled out from the roller 43. When the tonneau cover 42 is completely rolled onto the roller 43, a cargo compartment 48 may be viewed through a window glass 47 in the hatchback door 45. In this state, the tonneau cover 42 is located at a storage position. When the tonneau cover 42 is completely rolled out from the roller 43, the tonneau cover 42 conceals the cargo compartment 48. In this state, the tonneau cover 42 is located at an extension position.

The switch control unit 23 determines that the lock switch 32 has been pushed for a short time (short-pushed) when the operation signal from the lock switch 32 is received for a short time, that is, when the operation time of the lock switch 32 is less than a certain time. The switch control unit 23 determines that the lock switch 32 has been pushed for a long time (long-pushed) when the operation signal from the lock switch 32 is received for a long time, that is, when the operation time of the lock switch 32 is greater than or equal to the certain time. In the present example, a short pushing operation is one example of a first pattern of a switch operation, and a long pushing operation is one example of a second pattern of a switch operation.

The in-vehicle controller 21 includes a non-volatile memory 21a. The memory 21a stores an ID code.

The LF transmission unit 26 is arranged in, for example, each outer door handle of the vehicle 2. The in-vehicle reception unit 27 is arranged in the vehicle 2.

The verification control unit 25 generates the request signal 110 in fixed intervals and sends the request signal 110 to the LF transmission unit 26. The LF transmission unit 26 modulates the request signal 110 and transmits the modulated signal (request signal 110) from a transmission antenna 26a to the surrounding of the vehicle 2 as a wireless signal on the LF band. When the electronic key 10 receives the request signal 110, the electronic key 10 transmits a response signal 112, which includes the ID code.

The in-vehicle reception unit 27 receives the response signal 112 with a reception antenna 27a, demodulates the response signal 112 to a pulse signal, and sends the pulse signal to the verification control unit 25. The verification control unit 25 compares the ID code in the pulse signal (response signal 112) with the ID code stored in the memory 21a. The verification control unit 25 notifies the door control unit 24 and the tonneau cover control unit 22 of the ID code verification result. When ID code verification is accomplished, the door control unit 24 shifts to a state permitting control of the vehicle doors. When the lock switch 32 is short-pushed in a state in which ID code verification is accomplished, the door control unit 24 drives the door locking device 34 to switch the vehicle doors between a lock state and an unlock state.

Further, when ID code verification is accomplished, the tonneau cover control unit 22 shifts to a state permitting control of the tonneau cover 42. When the lock switch 32 undergoes a long pushing operation in a state in which ID code verification is accomplished, the tonneau cover control unit 22 moves the tonneau cover 42 between the extension position and the storage position. For example, when the tonneau cover 42 is located at the extension position, the tonneau cover control unit 22 moves the tonneau cover 42 to the storage position. When the tonneau cover 42 is located at the storage position, the tonneau cover control unit 22 moves the tonneau cover 42 to the extension position.

The operation of the tonneau cover device 50 will now be described.

When the user leaves the vehicle 2, the user short-pushes the lock switch 32 of, for example, the driver's door to lock the vehicle door. Here, the user may become aware that the tonneau cover 42 is arranged at the storage position and that objects in the cargo compartment are visible from outside the vehicle 2. In this case, the user long-pushes the lock switch 32 of the closest vehicle door. This moves the tonneau cover 42 from the storage position to the extension position and conceals the cargo compartment 48.

After removing an object from or placing an object in the cargo compartment 48 and closing the hatchback door 45, the user may long-push the lock switch 32 of the hatchback door 45 to move the tonneau cover 42 from the storage position to the extension position.

The tonneau cover device 50 of the first embodiment has the advantages described below.

(1) Even when the user is outside the vehicle 2, the user may long-push the lock switch 32 to move the tonneau cover 42 between the extension position and the storage position. This improves convenience for a user that uses the tonneau cover device 50.

(2) The user short-pushes the lock switch 32 to switch the vehicle doors between a lock state and an unlock state. Further, the user may move the tonneau cover 42 by long-pushing the lock switch 32. Thus, there is no need to provide a switch dedicated for the tonneau cover 42. This further simplifies the structure of the tonneau cover device 50.

In this manner, the operation contents of the lock switch 32 may be combined with the control of the tonneau cover device 50 and the control of the vehicle doors so that short-pushing readily locks and unlocks the vehicle doors and long-pushing moves the tonneau cover 42 when necessary.

<Second Embodiment>

A tonneau cover device 50 according to a second embodiment will now be described with reference to FIG. 3. In the second embodiment, the structure of the electronic key system 1 (wireless key system) differs from the first embodiment. Otherwise, the structure of the second embodiment is the same as that of the first embodiment shown in FIG. 1. The differences from the first embodiment will now be described.

Figure 3:
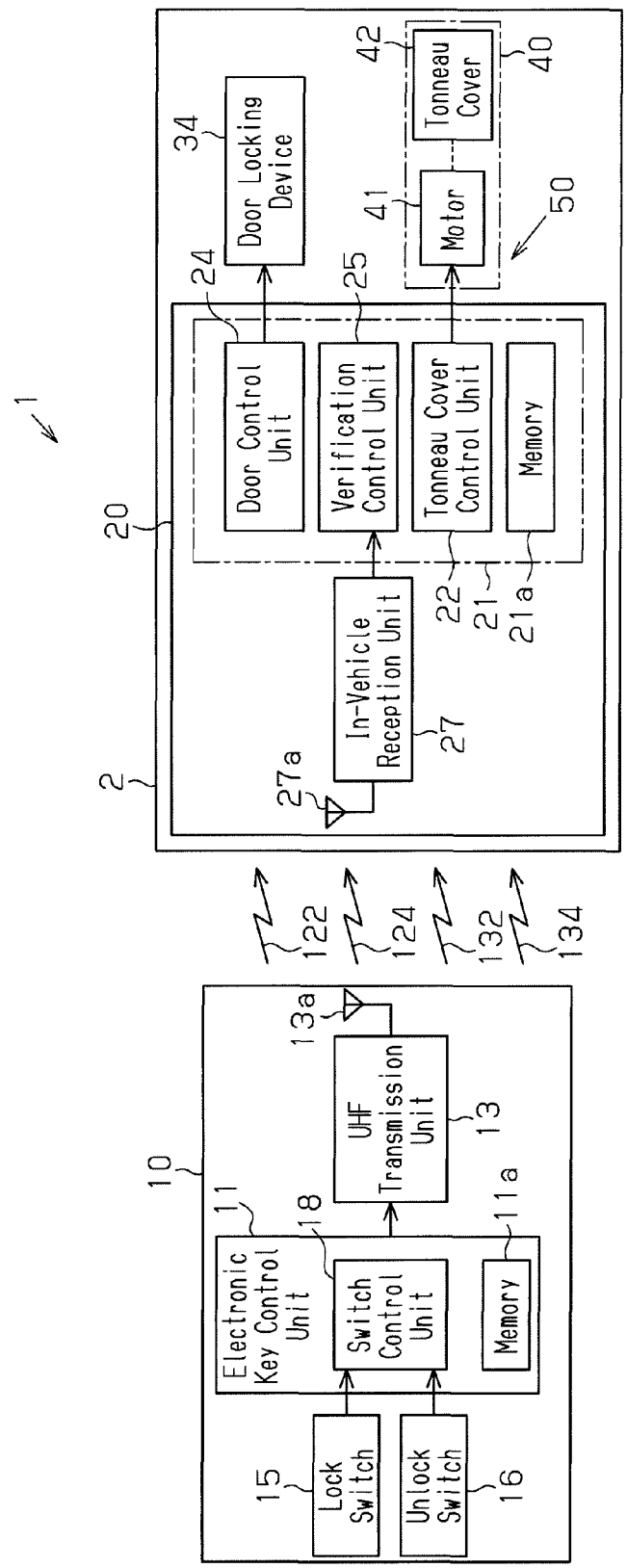
FIG. 3 is a block diagram of an electronic key system in a second embodiment.

As shown in FIG. 3, in the second embodiment, the LF reception unit 14, the LF transmission unit 26, the lock switch 32, and the switch control unit 23 may be eliminated.

The electronic key 10 includes a lock switch 15, which is operated when locking the vehicle doors, and an unlock switch 16, which is operated when unlocking the vehicle doors. The lock switch 15 and the unlock switch 16 each send an operation signal, when pushed, to the electronic key control unit 11.

The electronic key control unit 11 includes a switch control unit 18. The tonneau cover device 50 of the second embodiment includes the tonneau cover control unit 22, the switch control unit 18, the switches 15 and 16, and the tonneau cover unit 40. In the same manner as the switch control unit 23 of the in-vehicle controller 21 in the first embodiment, the switch control unit 18 determines the operation content of the lock switch 15 and the unlock switch 16. More specifically, the switch control unit 18 determines that the lock switch 15 or the unlock switch 16 has been pushed for a short time (short-pushed) when the operation signal from the lock switch 15 or the unlock switch 16 is received for a short time, that is, when the operation time of the lock switch 15 or the unlock switch 16 is less than a certain time. The switch control unit 23 determines that the lock switch 15 or the unlock switch 16 has been pushed for a long time (long-pushed) when the operation signal from the lock switch 15 or the unlock switch 16 is received for a long time, that is, when the operation time of the lock switch 15 or the unlock switch 16 is greater than or equal to the certain time.

When the switch control unit 18 determines that the lock switch 15 has been short-pushed, the electronic key control unit 11 sends a lock request signal 122, which includes the ID code stored in the memory 11a, to the UHF transmission unit 13. The lock request signal 122 is a signal that requests the locking of the vehicle doors. The UHF transmission unit 13 modulates the lock request signal 122 and transmits the modulated signal (lock request signal 122) from the transmission antenna 13a as a wireless signal on the UHF band. The lock request signal 122 is one example of a lock-unlock request signal.

When the switch control unit 18 determines that the unlock switch 16 has been short-pushed, the electronic key control unit 11 sends an unlock request signal 124, which includes the ID code stored in the memory 11a, to the UHF transmission unit 13. The unlock request signal 124 is a signal that requests the unlocking of the vehicle doors. The UHF transmission unit 13 modulates the unlock request signal 124 and transmits the modulated signal (unlock request signal 124) from the transmission antenna 13a as a wireless signal on the UHF band. The unlock request signal 124 is one example of a lock-unlock request signal.

When the switch control unit 18 determines that the lock switch 15 has been long-pushed, the electronic key control unit 11 sends an extension request signal 132, which includes the ID code stored in the memory 11a, to the UHF transmission unit 13. The extension request signal 132 is a signal that requests the movement of the tonneau cover 42 to the extension position. The UHF transmission unit 13 modulates the extension request signal 132 and transmits the modulated signal (extension request signal 132) from the transmission antenna 13a as a wireless signal on the UHF band. The extension request signal 132 is one example of a tonneau cover control request signal.

When the switch control unit 18 determines that the unlock switch 16 has been long-pushed, the electronic key control unit 11 sends a storage request signal 134, which includes the ID code stored in the memory 11a, to the UHF transmission unit 13. The storage request signal 134 is a signal that requests the movement of the tonneau cover 42 to the storage position. The UHF transmission unit 13 modulates the storage request signal 134 and transmits the modulated signal (storage request signal 134) from the transmission antenna 13a as a wireless signal on the UHF band. The storage request signal 134 is one example of a tonneau cover control request signal.

The in-vehicle reception unit 27 demodulates the request signals 122, 124, 132, and 134 received by the reception antenna 27a and sends the demodulated signal to the in-vehicle controller 21. The verification control unit 25 compares the ID code, which is included in the lock request signal 122, with the ID code stored in the memory 21a to perform ID code verification. When ID code verification is accomplished, the door control unit 24 drives the door locking device 34 and locks the vehicle doors. In the same manner, the verification control unit 25 compares the ID code, which is included in the unlock request signal 124, with the ID code stored in the memory 21a to perform ID code verification. When ID code verification is accomplished, the door control unit 24 drives the door locking device 34 and unlocks the vehicle doors.

Further, the verification control unit 25 compares the ID code, which is included in the extension request signal 132, with the ID code stored in the memory 21a to perform ID code verification. When ID code verification is accomplished, the tonneau cover control unit 22 drives the motor 41 and moves the tonneau cover 42 to the extension position. In the same manner, the verification control unit 25 compares the ID code, which is included in the storage request signal 134, with the ID code stored in the memory 21a to perform ID code verification. When ID code verification is accomplished, the tonneau cover control unit 22 drives the motor 41 and moves the tonneau cover 42 to the storage position.

In addition to advantages (1) and (2) of the first embodiment, the tonneau cover device 50 of the second embodiment has the advantages described below.

(3) The user long-pushes the lock switch 15 or the unlock switch 16 of the electronic key 10 to move the tonneau cover 42 to the extension position or the storage position. Accordingly, when the user is distant from the vehicle 2 and becomes aware that the tonneau cover 42 is located at the storage position, the user only needs to long-push the lock switch 15 and move the tonneau cover 42 to the extension position. This further improves convenience for the user.

(4) When the user leaves the vehicle 2, the user may short-push the lock switch 15 and then long-push the lock switch 15 to move the tonneau cover 42 to the extension position after locking the vehicle doors. Accordingly, the user may leave the vehicle 2 in a preferred state just by operating the same lock switch 15.

Further, when entering the vehicle 2, the user may short-push the unlock switch 16 and then long-push the unlock switch 16 to move the tonneau cover 42 to the storage position after unlocking the vehicle doors. Accordingly, the user may obtain a preferred state for placing an object in the cargo compartment 48 just by operating the same unlock switch 16.

In any of the above cases, the user continues to push the same one of the two switches 15 and 16. This allows for the locking and unlocking of the vehicle doors and the movement of the tonneau cover 42 to be performed further smoothly.

It should be apparent to those skilled in the art that the present invention may be embodied in many other specific forms without departing from the scope of the invention. Particularly, it should be understood that the present invention may be embodied in the following forms.

In the first embodiment, when the switch control unit 23 determines that the lock switch 32 has been short-pushed during movement of the tonneau cover 42, the tonneau cover control unit 22 may stop the movement of the tonneau cover 42. In this case, when the lock switch 32 is long-pushed again, the movement direction of the tonneau cover 42 is reversed. Also, in the second embodiment, when the tonneau cover control unit 22 receives the lock request signal 122 or the unlock request signal 124 from the electronic key 10 during movement of the tonneau cover 42, the tonneau cover control unit 22 may stop the movement of the tonneau cover 42.

In the first and second embodiments, the tonneau cover control unit 22 may move the tonneau cover 42 only during the period in which the lock switch 32 is long-pushed or during the period in which either one of the lock switch 15 and the unlock switch 16 is long-pushed.

In the first embodiment, when the lock switch 32 is long-pushed in a state in which ID code verification is satisfied, the tonneau cover 42 is remotely controlled. However, the operation contents of the lock switch 32 are not limited in such a manner. For example, the lock switch 32 may be continuously pushed a number of times to remotely control the tonneau cover 42.

In the first embodiment, when ID code verification is accomplished and the lock switch 32, which is normally used to switch lock and unlock states of the vehicle doors, is long-pushed, the tonneau cover 42 is remotely controlled.

However, a tonneau cover switch dedicated to remotely controlling the tonneau cover 42 may be used. The tonneau cover switch may be arranged, for example, next to the lock switch 32 of the hatchback door 45. In this structure, the tonneau cover switch is short-pushed to move the tonneau cover 42. The tonneau cover switch may be formed by a single switch or more than one switch. When forming the tonneau cover switch with one switch, for example, the movement direction of the tonneau cover 42 is reversed whenever the tonneau cover switch is pushed. When forming the tonneau cover switch with more than one switch, for example, an extension switch is pushed whenever moving the tonneau cover 42 to the extension position, and a storage switch is pushed whenever moving the tonneau cover 42 to the storage position. The structure eliminates the need to long-push a switch and may thus move the tonneau cover 42 to the extension position or the storage position more readily. In the same manner, the electronic key 10 in the second embodiment may include such a tonneau cover switch that is discrete from the switches 15 and 16.

In the first embodiment, when ID code verification is accomplished and the lock switch 32 of a vehicle door is long-pushed, the tonneau cover 42 is moved. However, the tonneau cover 42 may be moved when only the lock switch 32 of the hatchback door 45 is long-pushed. In this case, when the user unintentionally long-pushes the lock switch 32 of the driver's door, the tonneau cover 42 does not move. This prevents unintentional movement of the tonneau cover 42.

In the first and second embodiments, the in-vehicle controller 21 may notify the user with a display unit (lamp or the like) or voice generation unit that the tonneau cover 42 has reached the extension position. In the same manner, the in-vehicle controller 21 may notify the user with a display unit or voice generation unit that the tonneau cover 42 has reached the storage position.

In the first and second embodiments, the tonneau cover 42 is moved to the storage position or the extension position by operating a switch from outside the vehicle 2. However, movement of the tonneau cover 42 when a switch is operated may be limited to only the extension position.

In the first and second embodiments, the tonneau cover 42 is a soft sheet of a fabric or the like. However, the tonneau cover 42 may be hard and include a plurality of separate plates. In this case, a link mechanism joins the plates. Such a tonneau cover folds and stacks the plates when at the storage position. When spreading out the tonneau cover from the storage position to the extension position, the plates lie along the same plane.

In the first and second embodiments, the tonneau cover control unit 22 is arranged in the in-vehicle controller 21. However, the tonneau cover control unit 22 may be discrete from the in-vehicle controller 21.

In the first embodiment, the tonneau cover control unit 22 and the switch control unit 23 are functionally separated. However, the tonneau cover control unit 22 may include the function of the switch control unit 23. Further, the functions of two or more of the tonneau cover control unit 22, the switch control unit 23, the door control unit 24, and the verification control unit 25 may be combined. Alternatively, the function of each control unit may be further finely separated. The same applies to the second embodiment.

The present examples and embodiments are to be considered as illustrative and not restrictive, and the invention is not to be limited to the details given herein, but may be modified within the scope and equivalence of the appended claims.

The invention claimed is:

1. An electronic key system for controlling a tonneau cover device in a vehicle, wherein the tonneau cover device includes a tonneau cover and a motor, the motor configured to be driven to move the tonneau cover between an extension position, at which the tonneau cover conceals a cargo compartment of the vehicle, and a storage position, at which the tonneau cover is separated from the cargo compartment, the electronic key system comprising:
a switch arranged on an outer side of a vehicle door, wherein the switch is configured to output an operation signal when pushed;
an in-vehicle device installed in the vehicle; and
an electronic key capable of communicating with the in-vehicle device through wireless communication,
wherein the in-vehicle device includes:
a verification control unit configured to generate a request signal and perform ID code verification of the electronic key based on a response signal transmitted from the electronic key through wireless communication in response to the request signal transmitted from the vehicle through wireless communication
a switch control unit electrically connected to the switch and the verification control unit, wherein the switch control unit is configured to determine, based on the operation signal from the switch, whether a first operation for locking and unlocking the vehicle door is performed on the switch or a second operation for moving the tonneau cover is performed on the switch; and
a tonneau cover control unit electrically connected to the motor, the verification control unit, and the switch control unit, wherein the tonneau cover control unit is configured to drive the motor to move the tonneau cover between the extension position and the storage position when the switch is operated by the second operation in a state in which the ID code verification of the electronic key is accomplished.

2. The electronic key system according to claim 1, further comprising:
a door locking device installed in the vehicle and configured to lock and unlock the vehicle door, wherein
the in-vehicle device further includes a door control unit electrically connected to the verification control unit and the switch control unit, and
the door control unit is configured to drive the door locking device to switch the vehicle door between a lock state and an unlock state when the first operation is performed on the switch in a state in which the ID code verification of the electronic key is accomplished.

3. The electronic key system according to claim 2, wherein:
the first operation is a short pushing operation in which the switch is operated for a period that is less than a certain time; and
the second operation is a long pushing operation in which the switch is operated for a period that is greater than or equal to the certain time.

4. The tonneau cover device electronic key system according to claim 1, wherein the switch is arranged at an outer side of a hatchback door located at the rear of the vehicle.

5. The electronic key system according to claim 1, wherein the switch is arranged at an outer side of each of a plurality of vehicle doors including a hatchback door located at the rear of the vehicle.

* * * * *